(12) United States Patent
Viswanathan et al.

(10) Patent No.: US 9,300,467 B2
(45) Date of Patent: Mar. 29, 2016

(54) REAL-TIME COMMUNICATION SECURITY FOR AUTOMATION NETWORKS

(75) Inventors: Kapaleeswaran Viswanathan, Chennai (IN); Wilhelm Wiese, Minden (DE); Aswin Gopalan, Chennai (IN)

(73) Assignee: ABB RESEARCH LTD, Zurich (CH)

( * ) Notice: Subject to any disclaimer, the term of this patent is extended or adjusted under 35 U.S.C. 154(b) by 840 days.

(21) Appl. No.: 12/713,779

(22) Filed: Feb. 26, 2010

(65) Prior Publication Data
US 2010/0217967 A1    Aug. 26, 2010

Related U.S. Application Data

(63) Continuation of application No. PCT/IB2007/002497, filed on Aug. 28, 2007.

(51) Int. Cl.
*H04L 9/08* (2006.01)
*H04L 29/06* (2006.01)
(Continued)

(52) U.S. Cl.
CPC ............ *H04L 9/083* (2013.01); *H04L 12/4625* (2013.01); *H04L 63/0435* (2013.01); *H04L 63/061* (2013.01); *H04L 63/062* (2013.01); *H04L 63/065* (2013.01); *H04L 63/20* (2013.01);
(Continued)

(58) Field of Classification Search
CPC . H04L 63/04; H04L 63/0428; H04L 63/0435; H04L 63/06; H04L 63/061; H04L 63/065; H04L 63/08; H04L 63/20; H04L 9/08; H04L 9/0816; H04L 9/0819; H04L 9/083; H04L 63/062; H04L 2012/4026

USPC ............................ 713/2, 171, 153, 164, 168; 380/277–279; 709/225, 229
See application file for complete search history.

(56) References Cited

U.S. PATENT DOCUMENTS 5,325,432 A    6/1994   Gardeck et al.
6,269,349 B1 *  7/2001   Aieta et al. ...................... 705/80
(Continued)

FOREIGN PATENT DOCUMENTS

EP    1 050 991 A1    11/2000
EP    1 496 664 A1    1/2005
(Continued)

OTHER PUBLICATIONS

*International Search Report for PCT/IB2007/002497, mailed Jul. 21, 2009.
(Continued)

*Primary Examiner* — Zachary A Davis
(74) *Attorney, Agent, or Firm* — Buchanan Ingersoll & Rooney PC

(57) ABSTRACT

A framework, device and method are disclosed for providing broadcast communication security over Ethernet within an automation system, wherein a security plug provides secure working of the automation system. The security plug can be implemented using ASIC/FPGA technology to provide compatibility with existing systems and an intuitive plug-and-play model. An exemplary system can address jitter-sensitivity by providing a real-time architecture, with minimal transmission latencies. The security plug can have separate security and communication modules that make provisions for protocol independent working of the security plug, within these networks. The method can include bootstrapping, secret key establishment and secure communication, for providing real-time guarantees.

30 Claims, 7 Drawing Sheets

(51) Int. Cl.
*H04L 12/46* (2006.01)
*H04L 12/40* (2006.01)
*H04L 12/18* (2006.01)

(52) U.S. Cl.
CPC ............... *H04L 12/18* (2013.01); *H04L 63/126* (2013.01); *H04L 2012/4026* (2013.01)

(56) References Cited

U.S. PATENT DOCUMENTS

| | | | |
|---|---|---|---|
| 6,839,689 B2* | 1/2005 | Aieta et al. | 705/51 |
| 6,999,996 B2* | 2/2006 | Sunderland | 709/208 |
| 7,370,202 B2* | 5/2008 | Appenzeller et al. | 713/171 |
| 7,421,578 B1* | 9/2008 | Huang et al. | 713/163 |
| 7,493,661 B2* | 2/2009 | Liu et al. | 726/28 |
| 7,508,801 B1* | 3/2009 | Calhoun et al. | 370/338 |
| 7,530,113 B2* | 5/2009 | Braun | 726/28 |
| 7,562,211 B2* | 7/2009 | Paya et al. | 713/151 |
| 7,636,840 B2* | 12/2009 | Tang | 713/150 |
| 7,650,323 B2* | 1/2010 | Hesse et al. | 706/62 |
| 7,890,612 B2* | 2/2011 | Todd et al. | 709/220 |
| 8,266,286 B2* | 9/2012 | Kamarthy et al. | 709/226 |
| 8,406,248 B2* | 3/2013 | Pratt et al. | 370/444 |
| 8,451,809 B2* | 5/2013 | Pratt et al. | 370/338 |
| 2005/0010649 A1 | 1/2005 | Payne et al. | |
| 2005/0188194 A1 | 8/2005 | Fascenda | |
| 2006/0026672 A1* | 2/2006 | Braun | 726/9 |
| 2006/0097842 A1 | 5/2006 | Gielis | |
| 2006/0136575 A1 | 6/2006 | Payne et al. | |
| 2007/0006292 A1 | 1/2007 | Jaenicke | |
| 2008/0307054 A1* | 12/2008 | Kamarthy et al. | 709/206 |

FOREIGN PATENT DOCUMENTS

| | | |
|---|---|---|
| WO | WO 2005/057341 A2 | 6/2005 |
| WO | WO 2006/074436 A2 | 7/2006 |

OTHER PUBLICATIONS

*Jason M. Agron, Masters Thesis, "Run-Time Scheduling Support for Hybrid CPU/FPGA SoCs," University of Kansas, 2006.

*Ghassan Chaddoud et al., "Dynamic Group Communication Security," IEEE, Sixth IEEE Symposium on Computers and Communications, 2001, pp. 49-56.

*Internet Engineering Task Force, "Multicast Security Working Group," Description of Working Group, http://www.ietf.org/html.charters/msec-charter.html.

*Kapali Viswanathan et al., "An Analysis of Integrity Services in Protocols," INDOCRYPT'2001, Lecture Notes in Computer Science, pp. 175-187, vol. 2247, ISBN 3-540-43010-5.

* cited by examiner

REAL-TIME COMMUNICATION SECURITY FOR AUTOMATION NETWORKS

RELATED APPLICATIONS

This application claims priority as a continuation application under 35 U.S.C. §120 to PCT/IB2007/002497 filed as an International Application on Aug. 28, 2007 designating the U.S., the entire content of which is hereby incorporated by reference in its entirety.

FIELD

A system for real-time communication security for automation networks is disclosed.

BACKGROUND INFORMATION

With the increased desire for secure remote servicing of automation equipment, usage of wireless devices in automation networks, and upcoming Government regulations, it has become important to provide data security services such as confidentiality and authenticity to automation networks on par with IT communication networks.

Cryptography is the science and art for realizing confidential and authentic communications over insecure communications channels, such as the Ethernet or the Internet. Confidentiality is a cryptographic service for ensuring that only a pre-determined set of entities can read a communicated message using a parameter called a key. Authentication is a cryptographic service for verifying that only a pre-determined set of entities could have generated a communicated message with or without the usage of a key. A third aspect of information security is availability, which involves a system guarantee that any authorized entity can access available data on demand and that such an access cannot be prevented or subverted. Higher response rates of computation systems are desirable to mitigate the effects of denial of service attacks.

The communication security mechanisms presently available were developed for data-driven communications, such as those over the Internet, which did not encompass real-time or jitter-sensitivity requirements. Limited, or practically non-existent, security technology currently exists for providing data security to such real time and jitter sensitive automation networks where communication latency is important.

The time elapsed between sending a request by an automation application on an automation network and receiving the corresponding response is called response time. The communications on automation networks have relied on the Ethernet protocol for realizing real-time, low-latency automation communications. The response time for communications on automation networks can be on the order of milliseconds. With unwarranted delays due to the scheduling action of a real time operating system (RTOS) used in a microprocessor implementation of an automation device, the system may not provide hard real time performance as desired for an automation network. Since logical communication security measures involve another sequential process in communication stacks, it can be important to ensure that these sequential processes do not contribute adversely to communication overhead.

Siemens SCALANCE S provides security modules with features to protect traffic, data and network activity amidst a set of programmable logic controllers (PLCs). An exemplary wireless gateway provides secure interaction between several field devices connected by several FIELDBUS, Modbus, DF1, Profibus Decentralized Peripherals (DP), Modbus Transmission Protocol (TCP) and Ethernet TCP/IP networks. Secure login devices have been proposed for device level communication. Another security solution has been proposed to protect systems used in automation from a variety of attacks. These products and solutions do not incorporate features such as broadcast communication or device level redundancy. Further, the implementation of these products does not explicitly call for the use of Field Programmable Gate Arrays (FPGAs) or Application Specific Integrated Circuits (ASICs). Known industrial firewalls (e.g., the Eagle_F-W_MM_SCTX firewall) can provide device level redundancy and can be implemented on an FPGA/ASIC platform (e.g., Inominate Mguard Firewall), however, these features are maintained in isolation of other features such as protocol independence.

WO2006074436 discloses a firewall method and apparatus for industrial systems wherein networked devices in an automation setup, connected using a plurality of protocols, interact using a dual packet protocol.

EP1496664 discloses a system, method and security module for securing the access of a user to at least one automation component of an automation system, wherein a safety device is proposed which is placed within an automation network to provide security to the components interconnected via the network. In EP1496664, the safety device appears to be restricting access to the devices using pre-defined access control rules, implemented in the safety device.

US2007006292 discloses a method and system for transparent transmission of data traffic between data processing devices, a corresponding computer program product, and a corresponding computer-readable storage medium wherein a system implemented as either a firewall or a proxy is used to provide security within an automation network. This patent proposes the insertion of a computer as a conduit for delivering data between interconnected components, the system being the only security device.

SUMMARY

A system is disclosed for providing broadcast communication security over Ethernet for an automation network, comprising: a security plug, configured as an Ethernet based and application protocol-independent device for providing broadcast communication security between a set of automation components attached to the automation network; a key server, for distributing a key to the security plug to communicate securely; and means for initializing and managing keys across plural security plugs.

A device is also disclosed for providing real-time, secure communication in an automation network having plural automation components, the device comprising: security logic modules including: a key management module; a broadcast key establishment module; a confidentiality module; and an integrity module. The device also comprises Ethernet communication logic including: security bootstrap communication logic; and communication logic.

A method for is also disclosed for providing real-time, secure communication in an automation network having plural automation components integrally coupled with (a) at least one security plug and (b) at least one key server, the method comprising: performing a bootstrapping technique configured with options for: secret key establishment; and secure communication wherein messages received from a controller are directly processed by confidentiality and integrity modules of the security plug.

BRIEF DESCRIPTION OF THE DRAWINGS

Other features and advantages disclosed herein will be described in conjunction with the detailed description and accompanying drawings, wherein.

DETAILED DESCRIPTION

A framework is disclosed for providing security within an automation system wherein a device called a security plug is integral to providing functionality for the secure working of the automation system. The security plug can be implemented using ASIC/FPGA technology to provide compatibility with existing systems. An exemplary system can address jitter-sensitivity, which can be important in, for example, automation networks, by providing a real-time architecture, with minimal transmission latencies.

An exemplary system as disclosed herein can include the following features:

Secure communication can be provided by addressing attacks such as eavesdropping and unauthorized accesses or modifications of network traffic. An exemplary embodiment can be Ethernet-based, and can layer security services over the Ethernet protocol to ensure easy integration into existing networks.

Protocol Independence along with broadcast support can also be provided. Further, an exemplary system can be reliable and can make provisions for providing redundancy in key components that enable security within the system.

A framework as disclosed herein can include a variety of usage modes of the security plug, a variety of bootstrapping techniques and varying of a session key server location, in order to provide a plurality of environments and configurations that encompass a variety of scenarios within automation networks.

A method is also disclosed for secure transmission of data over an automation network, which can be protocol independent, real-time, jitter sensitive and reliable. By minimizing transmission latencies, specific challenges of automation networks can be addressed, wherein a framework of light-weight protocols acts in conjunction for response times suited for these automation networks.

Figure 1:
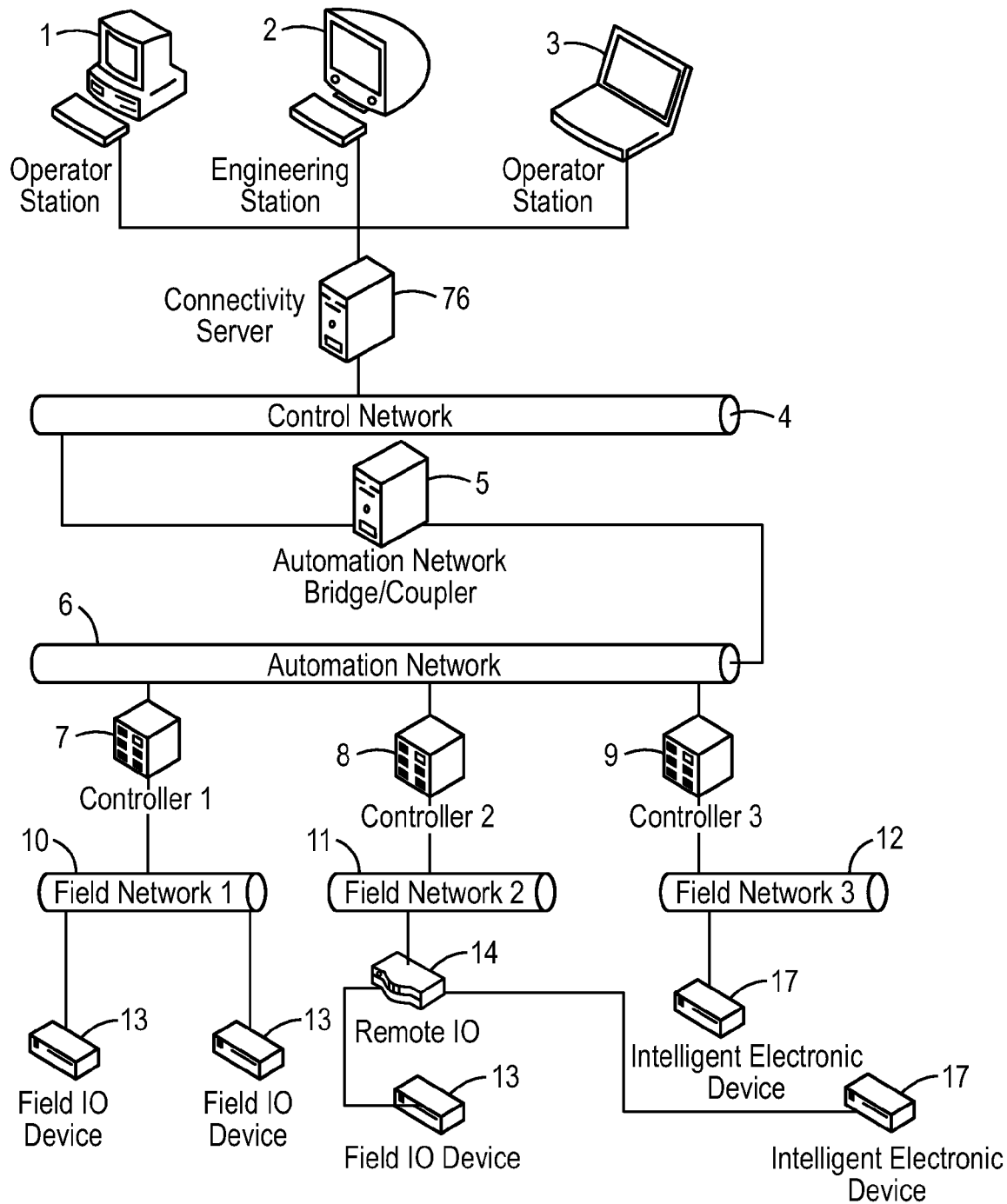
FIG. 1 shows an overall layout of interconnected components in an exemplary automation network.

FIG. 1 shows an overall layout of interconnected components in an exemplary automation network. A plurality of components including operator stations 1,3 and an engineering station 2 are connected by means of a control network 4 to an automation network bridge 5. This bridge 5 is further connected to an automation network 6 that interconnects several controllers 7,8,9 operating on a variety of field networks 10,11,12 connected to a number of field devices 13, remote 10 devices 14 and intelligent electronic devices (IED) 17. A system, device and method are disclosed to provide security to the real-time, jitter-sensitive communications on different automation and field networks in a protocol independent manner by providing an architecture which uses Field-Programmable Gate Arrays (FPGAs) or Application-Specific Integrated Circuits (ASICs) for realizing high-speed computations. The architecture can be efficient to support/adapt different key management schemes, cryptographic algorithms, and communication protocols. For example, the architecture can include a combination of wired and wireless technology and plural automation components each configured as at least one of an industrial controller, a field device, a connectivity server 76, an operator workstation 20, 22 and an engineering station 21.

Figure 2:
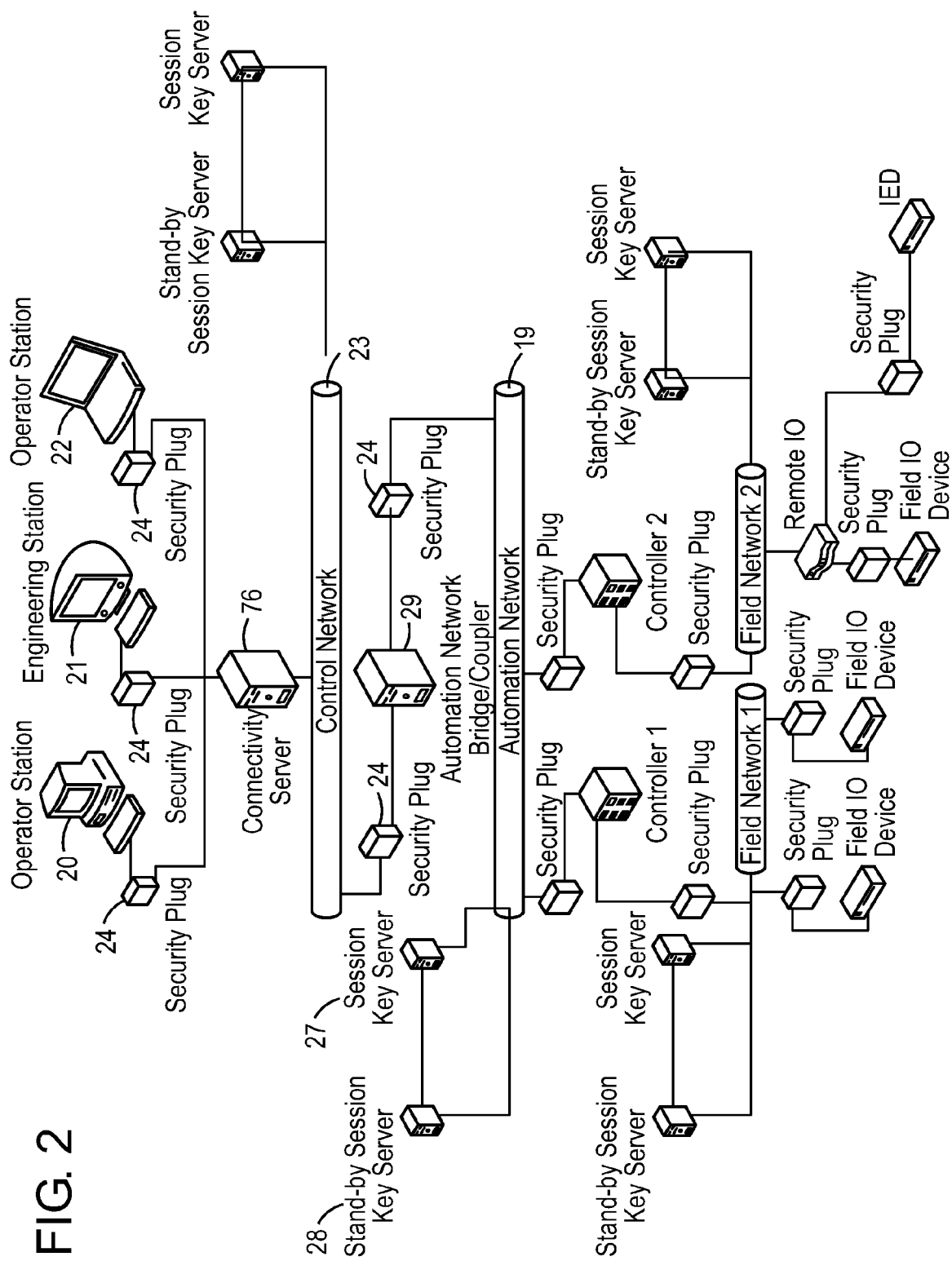
FIG. 2 shows an exemplary security plug as disclosed herein, being placed to provide secure communication within the network.

FIG. 2 shows an exemplary security plug as disclosed herein, being placed to provide secure communication within the network. In an exemplary system, two new components, namely one or more security plugs and one or more key servers are introduced in the automation network, for security. In FIG. 2, operator stations 20, 22 and an engineering station 21 are interconnected by a control network 23, by means of individual conduits, the security plugs 24. One or more session key servers 27 and stand-by session key servers 28 are also present to provide secure communication. It is to be noted that when two components interact securely, in an exemplary system as disclosed herein, two security plugs can be used, one on each communicating component. For example, FIG. 2 shows the communication between the control network 23 and the automation network 19 by means of an automation network bridge 29. In this case, two security plugs 24 are placed to enable this communication between the two networks.

Figure 3:
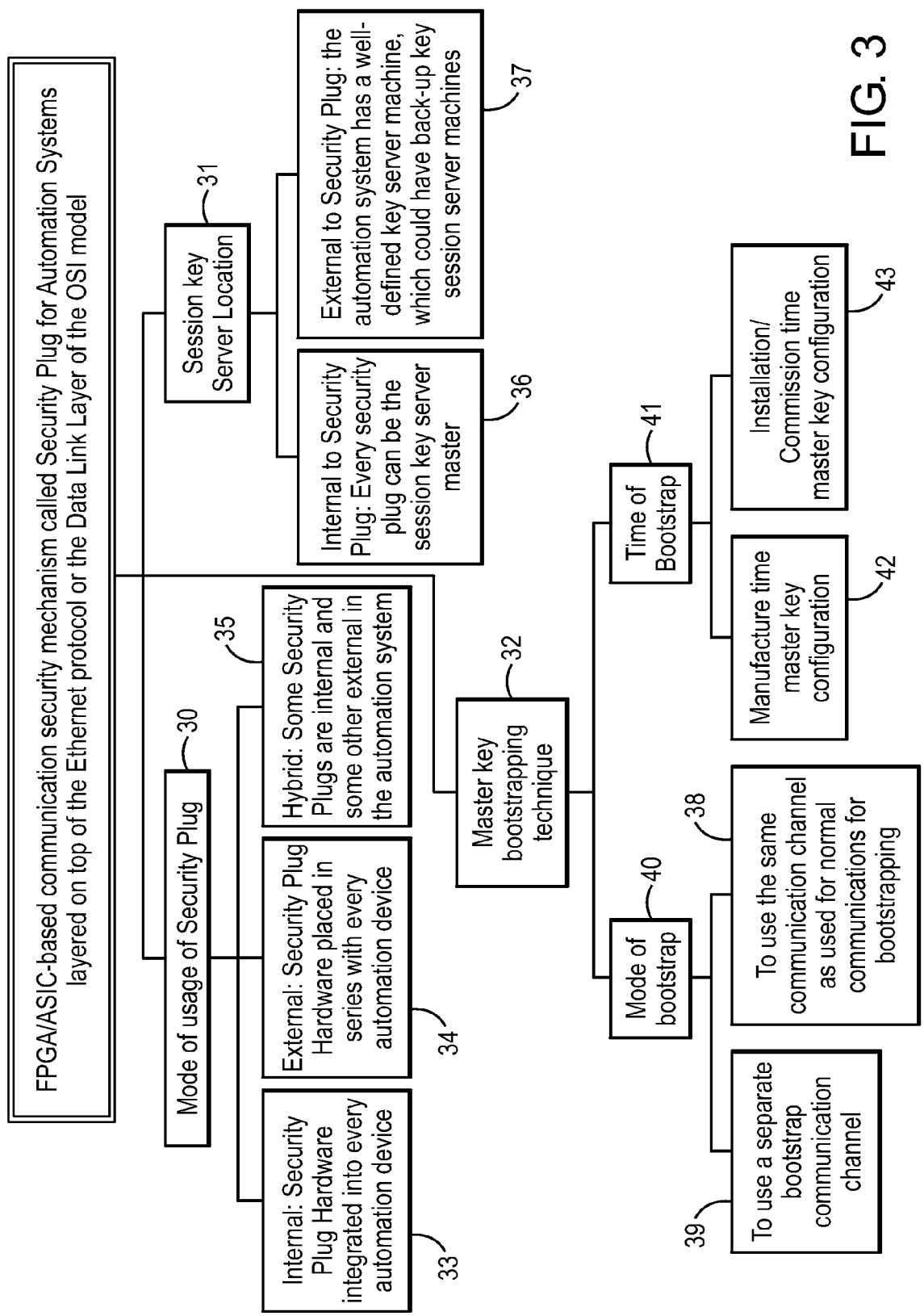
FIG. 3 shows an exemplary framework as disclosed herein.

FIG. 3 shows an exemplary framework, which proposes several modes of operation for the security plug 30, key server 31 and bootstrapping technique 32. The security plug can be used in different modes such as an internal mode 33 wherein the security plug may be placed integrated into a network node such that the module is still in series between the network node and the network. In this case, the security plug hardware would be integrated into the network elements to be provided, namely: operator station, engineering station, controller, field device and so on. An external mode 34 could also be used wherein the security plug may be placed in series between a network node and the network thus supporting legacy systems. A hybrid mode 35 can also be used, which is a combination of internal and external modes of operation.

The session key server 31 can be placed: internally to the security plug 36, wherein each security plug can be a key server master; or externally 37, wherein the automation system has a well-defined key server machine, which could have back up key server session machines, providing redundancy and distributing failure points. The architecture of the security plug would support dynamic formation of a group of communicating devices wherein a device may decide to enter or leave a group at any point of time but would have to inform the session key server present in the network about its action. Functionality of the session key server can be to establish/re-establish a common secret (initialization of new session keys) among the participants to communicate securely. The session keys can be used for providing security to the network traffic. The session key server can be responsible to control the group dynamics and accordingly establish session keys. A stand by session key server can also be provided for in case the main session key server ceases to function for any reason.

The master key bootstrapping technique 32 can also be termed as key management. The bootstrap information can be initialized on to all the security plugs in the automation network using two modes 40. In one mode, the same communication channel as used for normal communications such as Ethernet 38 can be used. In a second mode, an alternate dedicated communication channel 39 only for the purpose of bootstrapping the security plugs can be used. A major factor that would influence the decision of having a different communication interface would be the time taken for the bootstrap action. If the number of devices to be bootstrapped is large in number, then a dedicated, fast and efficient communication channel can be used.

There are two exemplary types of key management techniques, based on time of bootstrap 41. In a first manufacture-time key-management 42, keys are initialized before shipping the security plugs to customers. In a second installation-time key-management 43, keys are initialized subsequent to manufacture, such as during installation and/or commissioning of the security plugs.

Figure 4:
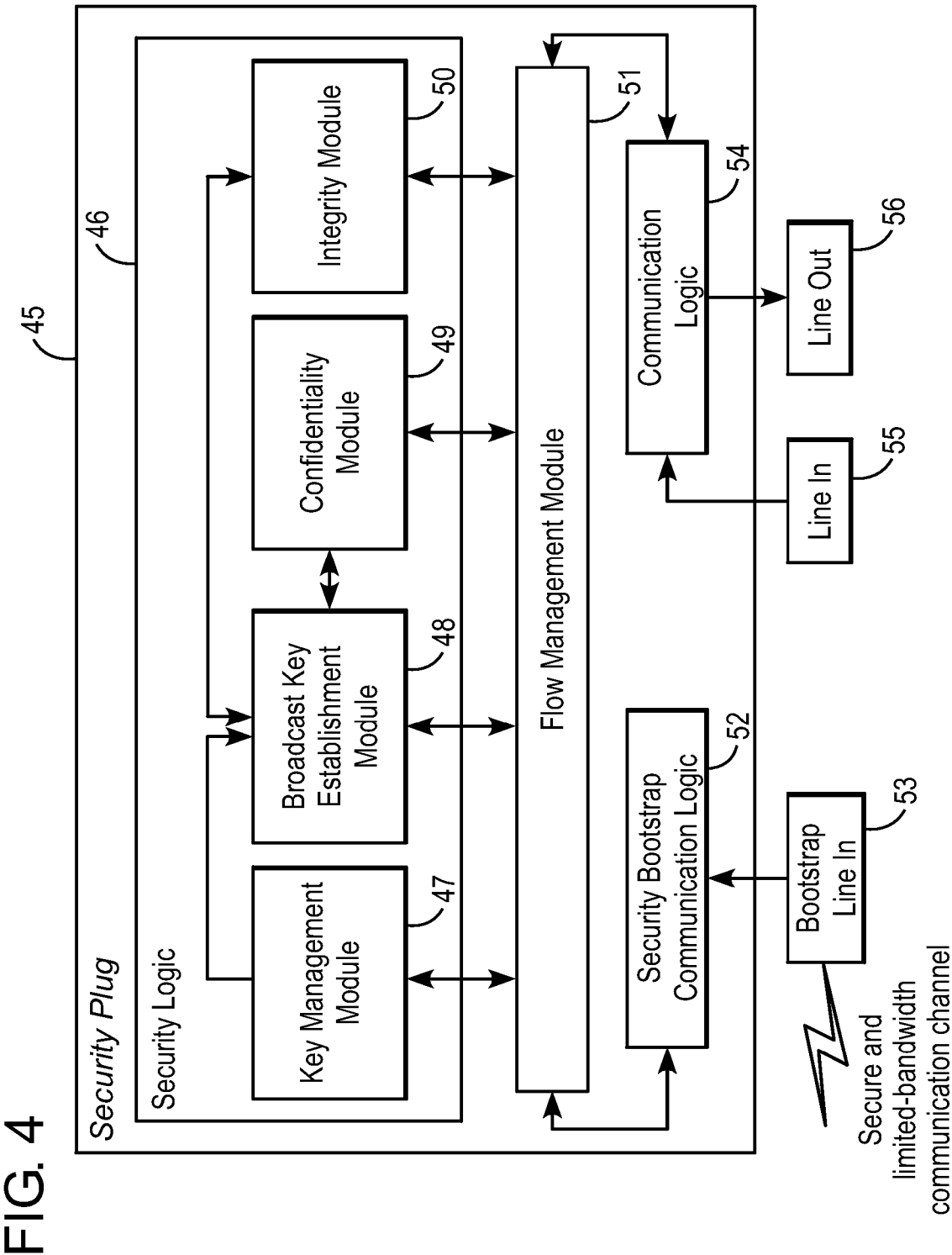
FIG. 4 shows a high-level block diagram of an exemplary external key server.

FIG. 4 shows a high-level block diagram of an exemplary security plug 45. The overall security logic 46 incorporates several components (e.g., program modules) such as a key management module 47, a broadcast key establishment module 48, a confidentiality module 49 and an integrity module 50. The security plug 45 can further include security bootstrap communication logic 52 with an incoming bootstrap line 53, and communication logic 54 with lines going in 55 and out 56. The security logic 46, security boot strap communication logic 52, and the communication logic 54 are housed in a unified hardware substrate.

The key management module 47 is responsible for storing the security bootstrap information available from the security bootstrap communication logic 52 in the security plug. It is also responsible for providing the necessary interfaces for other modules in the security plug to retrieve security bootstrap information.

The broadcast key establishment module 48 is responsible for using the long-term security bootstrap information to generate and distribute short-term session keys using the services of the confidentiality module 49, integrity module 50, communication logic 54 and the flow management module 51.

The confidentiality module 49 provides the interfaces for encrypting and decrypting data using a block cipher such as advanced encryption Standard (AES), Triple Data Encryption Standard (TDES), Data encryption Standard (DES), and Blowfish.

The integrity module 50 provides the interfaces for generating and verifying security checksums for data using a hash function including at least one of MD5, SHA1, and SHA2 and a message authentication code of at least one of a keyed-hash message authentication code (HMAC or NMAC), a cipher based message authentication code (CMAC), a Universal Hashing Message Authentication Code (UMAC), and Cipher Blockchaining Message Authentication Code (CBC-MAC). These services 49 and 50 can be used by the broadcast key establishment module 48 and the flow management module 51.

In an exemplary embodiment, the integrity module 50 and the confidentiality module 49 are implemented using authenticated encryption including at least one of Galois Counter Mode (GCM), a nonce-based Authenticated Encryption with Associated Data (EAX) Mode of Operation for cryptographic block ciphers (EAX), an offset codebook mode (OCB) of operation for cryptographic block ciphers, and a Counter with CBC-MAC (CCM) mode of operation for cryptographic block ciphers.

The flow management module 51 can ensure the data flow and operational control in the security plug 45, and can control and interface the various modules with each other.

The security bootstrap communication logic 52 provides a near-field communication channel that can be used by the key management module to perform key management operations on the security plug. The keys manager can use the key management module. This module can, for example, provide a near-field communication such as Bluetooth or physically protected communication channel with a short physical wire. This can ensure that physical access to the device is available to perform the key management operations.

The communication logic 54 can provide data interfaces for the flow management module 51 to interact with any physical medium, such as Internet protocol (IP), Ethernet, Wireless LAN, Foundation Fieldbus, Modbus, and so on. In order to work at the link level, just above a physical layer of the communication stack, a security plug architecture with the following properties can be used:

1. Use of Field-Programmable Gate Array (FPGA) or Application Specific Integrated Circuit (ASIC)—This property of the architecture can facilitate real-time, minimal-jitter, secure communication.
2. Broadcast communication security—Since the Ethernet protocol inherently supports broadcast communications, the security architecture can support authentication of broadcast communications [3]. Such a feature is desired for realizing protocol independence. This property would include a broadcast key-management mechanism and a broadcast message authentication mechanism. The broadcast key-management mechanism can include a suitable confidentiality mechanism in the security plug [3].

The use of FPGA/ASIC based technology for implementation of the security plug does not introduce jitter in the communication as the system would perform a dedicated functionality which it is programmed for, and there would be no resource contention issues as with the case of a microprocessor. The use of an FPGA does not eliminate jitter, but it can be significantly reduced when an RTOS is run on a FPGA/CPU based system [1].

Figure 5:
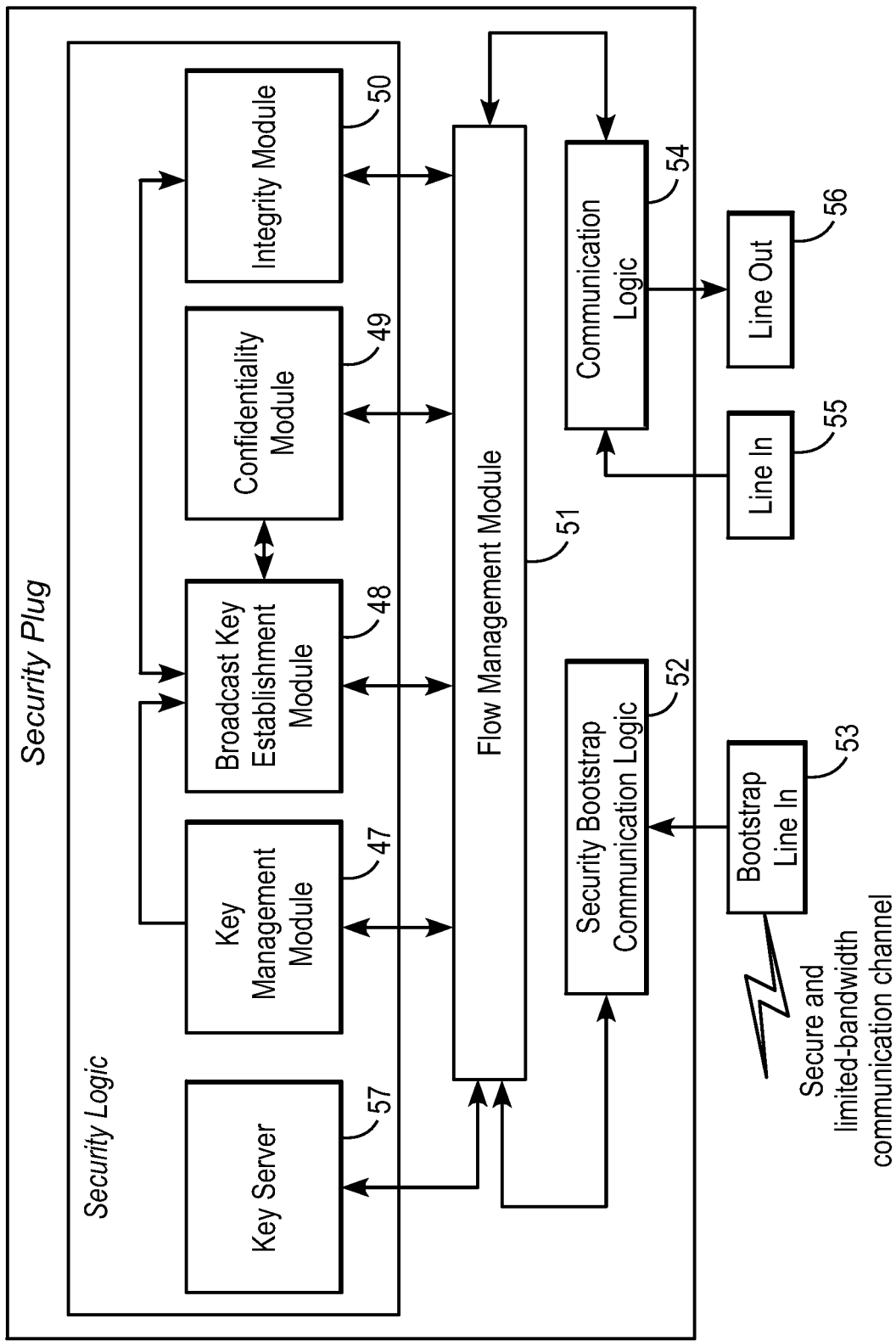
FIG. 5 shows a high-level block diagram of an exemplary internal key server.

The line-in 55 and line-out 56 depicted in the block diagram can use either a serial or parallel I/O operation. The protocol independence of the security plug can be realized by the ability to layer the security logic over different communication logic platforms. The architecture can be configured to meet requirements of automation networks that include real time communications, reliability, and fault tolerance. The functionalities of the various components of an exemplary architecture can be as follows:

The architecture of the security plug can provide for every security plug to act as a session key server. In this scenario, a special protocol can be executed among the participating devices to select the master key-server that would be responsible for generation and establishment of session keys among the other members of the group. All other security plugs having an internal key server and other identified key servers in the network can serve as standby. A special protocol can be used to choose the master key server during network boot-up or in the event of failure of the already identified master key-server. In an exemplary embodiment the remaining security plugs can be designated as slaves for receiving messages from the master key-server, and for applying cryptographic processing of the master server, and for verifying security of a sender. The high-level block diagram for an exemplary security plug with an internal key server is shown in FIG. 5. In this layout, the key server module 57 is internal to the security plug.

Figure 6:
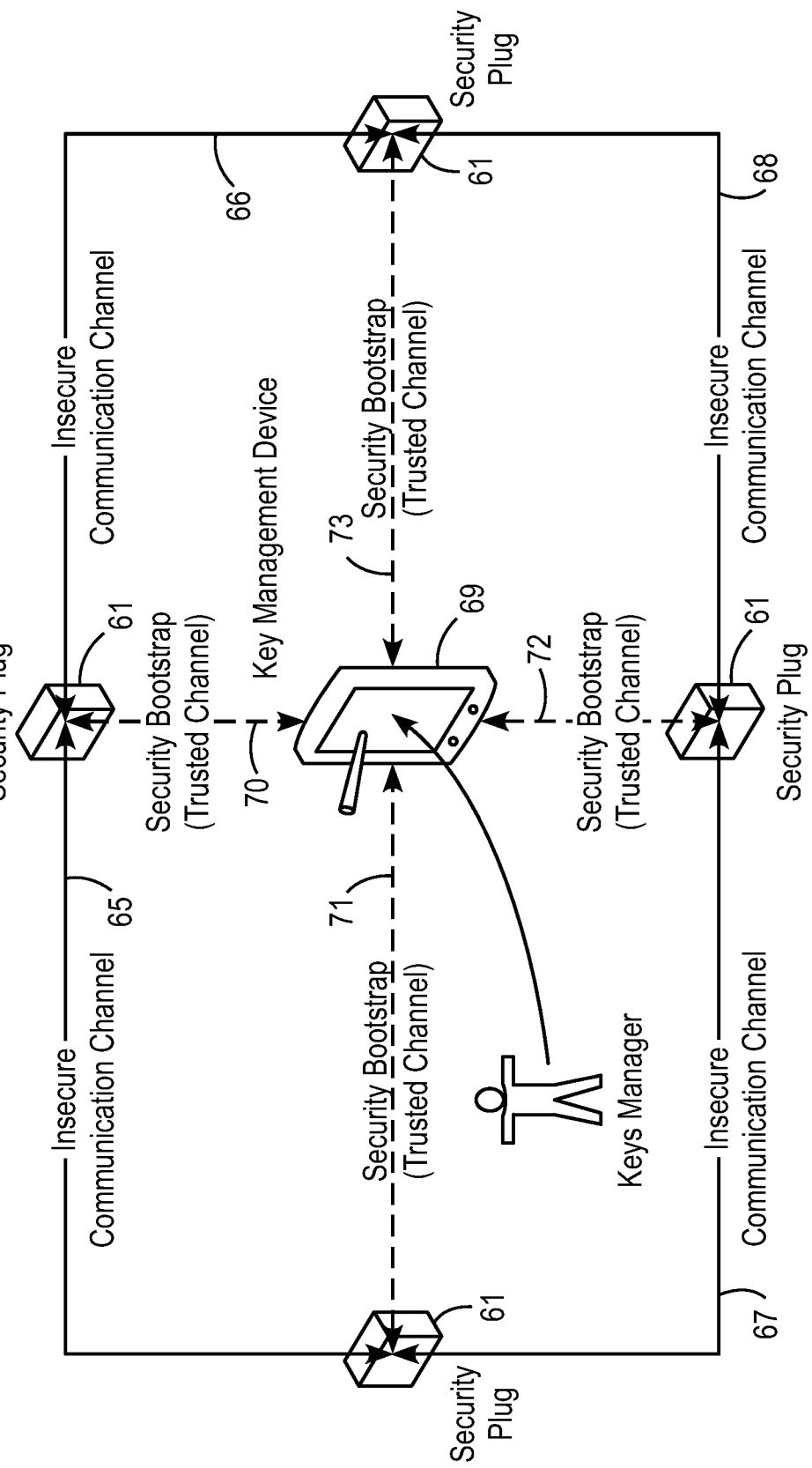
FIG. 6 describes exemplary key management system for the security plug.

FIG. 6 shows an exemplary key management system for the security plug. One or more security plugs 61 are connected via insecure communication channels 65, 66, 67, 68. These security plugs interact with a key management device 69, that interacts with the security plugs 61 over a trusted channel 70,71,72,73, used for secure bootstrapping. The keys initialized during the manufacture phase or installation phase can be termed as master keys. The master keys are long term keys which can then be used to derive session keys which can be used for securing the communications between devices.

Figure 7:
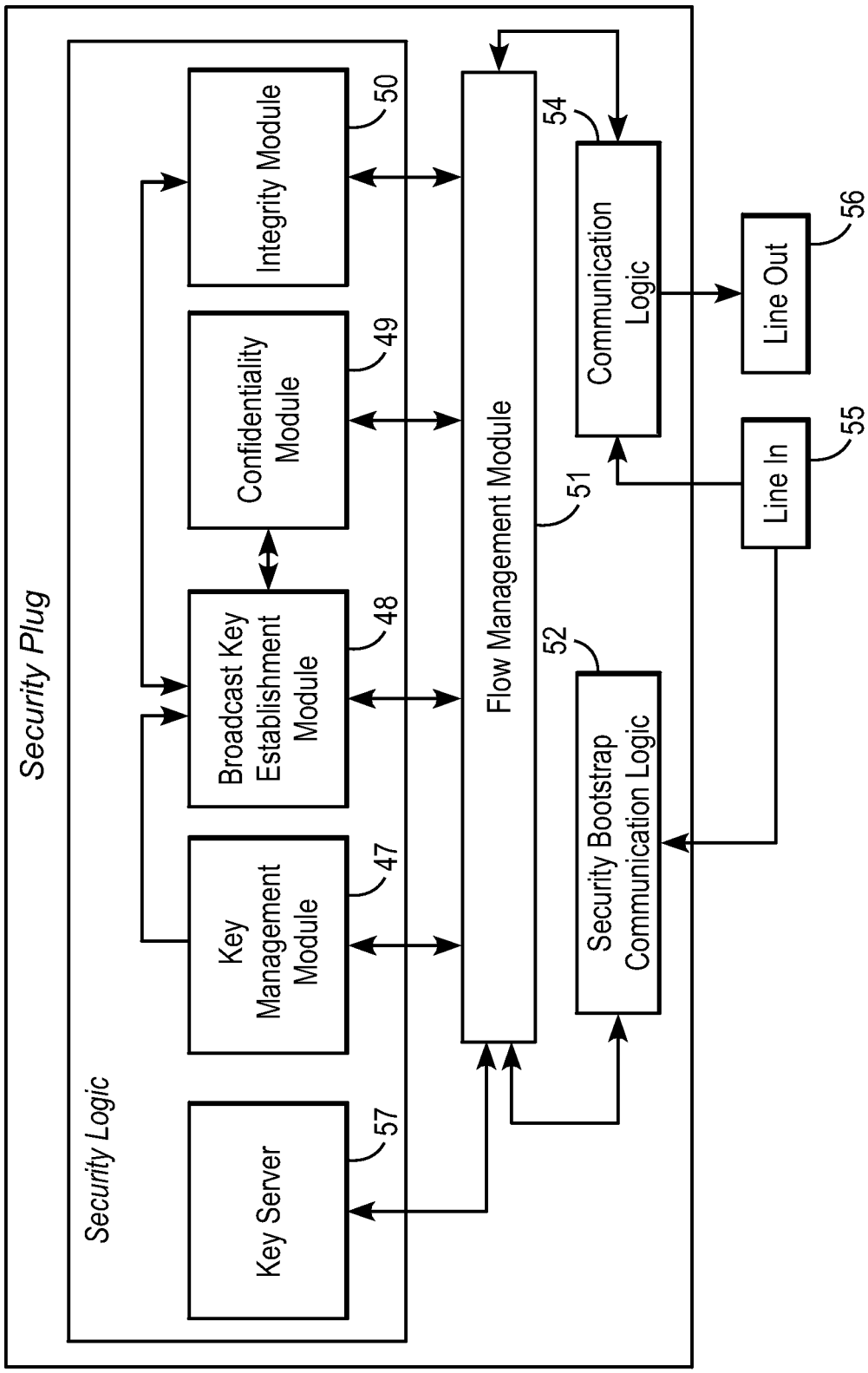
FIG. 7 shows an exemplary security plug architecture using a unified channel for bootstrapping.

FIG. 7 shows an exemplary security plug architecture using a unified channel for bootstrapping with no extra bootstrap line going in.

References cited herein are hereby incorporated by reference in their entireties:
[1] Jason M. Agron, Masters Thesis, "Run-Time Scheduling Support for Hybrid CPU/FPGA SoCs," University of Kansas, Year 2006. Available at: <<http://www.ittc.ku.edu/research/thesis/documents/jason_agron_thesis.pdf>>. Last Accessed: Nov. 20, 2006.
[2] Ghassan Chaddoud, Isabelle Chrisment, Andre Schaff, Loria-Inria, "Dynamic Group Communication Security," iscc, p. 0049, Sixth IEEE Symposium on Computers and Communications (ISCC'01), 2001.
[3] Internet Engineering Task Force, "Multicast Security Working Group," Last Modified: 2006 Jan. 12. Available at: <<http://www.ietf.org/html.charters/msec-charter.html>>. Last Accessed: Nov. 20, 2006.
[4] Kapali Viswanathan, Colin Boyd, Ed Dawson, "An Analysis of Integrity Services in Protocols," INDOCRYPT'2001, pages 175-187, Lecture Notes in Computer Science, Volume 2247, ISBN 3-540-43010-5, 2001.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for providing broadcast communication security over Ethernet for an automation network including at least one field network, the system comprising:
   a. a plurality of security plugs, wherein at least one security plug is configured as an Ethernet based and application protocol-independent device for providing broadcast communication security between a set of automation components including at least one field device attached to the at least one field network of the automation network; and
   b. a session key server for distributing a session key to each security plug to communicate securely with each device in the set of automation components during a communication session;
   wherein a first security plug from the plurality of security plugs is identified as a master key server by remaining security plugs of the plurality of security plugs, and the first security plug is configured to generate and manage session keys across the plurality of security plugs,
   wherein the first security plug is selected, upon network boot-up, from the plurality of security plugs by executing a protocol among the plurality of security plugs for selecting the first security plug as the master key server by the plurality of security plugs, and
   wherein a second security plug can be selected, upon failure of the first security plug, from the plurality of security plugs by executing a protocol among the plurality of security plugs for selecting the second security plug as the master key server by the plurality of security plugs.

2. The system of claim 1, wherein each security plug is deployed via at least one of:
   a. an internal mode, where the at least one security plug is internal to an automation component such that a serial connection exists across the at least one security plug, which is integral to the automation component, and the automation network;
   b. an external mode, where the at least one security plug is placed in series between the automation component and the automation network; and
   c. a hybrid mode, which is a combination of the internal and external modes.

3. The system of claim 1, wherein the session key server is placed one of internal and external to the at least one security plug.

4. The system of claim 1, wherein the at least one security plug is configured to establish the session keys and configured to initialize bootstrap information to other security plugs using one of:
   a. a mode of bootstrap, wherein at least one of (a) a separate communication channel and (b) an integrated communication channel is used to bootstrap devices of the automation network; and
   b. a time of bootstrap, wherein at least one of (a) the session keys are configured at a time of manufacture of the security plugs, and (b) the keys are configured during installation or commissioning of the security plugs.

5. The system of claim 1,
   wherein the at least one security plug is configured for broadcast-key establishment and broadcast data-security.

6. The system of claim 5, wherein the at least one security plug configured for broadcast-key establishment comprises: a confidentiality and integrity mechanism.

7. The system of claim 5, wherein the at least one security plug configured for broadcast-key establishment provides for secure communication in at least one of a unicast, multicast and broadcast communication.

8. The system of claim 1, wherein the at least one security plug is configured to perform at least two phases of operation including:
   a. broadcast secret key establishment wherein:
      i. the session key server sends and receives messages related to identification of one of plural servers as a master key server;
      ii. the master key server generates and establishes at least one of the session keys among the plural security plugs;
      iii. a broadcast key establishment module uses confidentiality and integrity modules to send key establishment messages to the plural security plugs, where a key management module loads long term master keys associated with the integrity and confidentiality modules to the broadcast key establishment module such that the confidentiality and the integrity modules communicate with a flow management module via the broadcast key establishment module;
      iv. the key management module is updated with master keys and initialization vectors;
      v. each session key is loaded on to the integrity and confidentiality modules by the broadcast key establishment module;
      vi. security plugs receive messages from the master key server and apply cryptographic processing that is a reverse or identical operation to cryptographic processing performed at the master key server and verify security of the sender; and
      vii. upon receiving an activation signal from the master key server, session keys are loaded on the confidentiality and the integrity modules, and updated in the key management module; and b. secure communication wherein messages received from a controller are processed by the confidentiality and integrity modules directly.

9. The system of claim 1, wherein each security plug includes field programmable gate arrays.

10. The system of claim 1, wherein each security plug includes application specific integrated circuits.

11. The system of claim 1, comprising: a combination of wired and wireless technology, and plural automation components each configured as at least one of an industrial controller, a field device, a connectivity server, an operator workstation and an engineering station.

12. A device for providing real-time, secure communication in an automation network including at least one field network and having plural automation components including at least one field device connected to the field network, the device for providing real-time, secure communication comprising:
   a processor configured to execute:
   a. security logic modules that provide dynamic formation of a group of automation components for communicating on the automation network, each security logic module including:
      i. a key management module;
      ii. a broadcast key establishment module for sending and receiving messages related to identification of one of plural automation components as a master key server by the plural automation components, upon network boot-up, and for sending and receiving messages related to identification of a second automation component from the plural automation components, upon failure of the one automation component;
      iii. a confidentiality module; and
      iv. an integrity module;
   b. Ethernet communication logic that enables the management of session keys between the group of automation components on the automation network, the Ethernet communication logic including:
      i. security bootstrap communication logic; and
      ii. communication logic; and
   c. a session key-server module for initializing and managing session keys across the plural of automation components, when the processor is selected as the master key server by the plural automation components.

13. The device of claim 12, wherein the processor is configured to execute a flow management module for data flow and operational control, and for controlling and interfacing the security logic modules with each other.

14. The device of claim 12, wherein the security logic modules and Ethernet communication logic are housed in a unified hardware substrate.

15. The device of claim 12, wherein components of the security logic modules are housed in a unified hardware substrate.

16. The device of claim 12 wherein:
   a. the key management module stores security bootstrap information from the security bootstrap communication logic and includes interfaces for remaining security logic modules to retrieve security bootstrap information;
   b. the broadcast key establishment module uses long-term security bootstrap information to generate and distribute short-term session broadcast-keys using the security communication logic, the confidentiality module, the integrity module, and a flow management module;
   c. the confidentiality module provides interfaces for encrypting and decrypting data by the broadcast key establishment module and the flow management module;
   d. the integrity module provides interfaces for generating and verifying security checksums for data by the broadcast key establishment module and the flow management module;
   e. the flow management module provides data flow and operational control for the remaining security logic modules;
   f. the security bootstrap communication logic provides a communication channel for the key management module to manage key operations; and
   g. the security bootstrap communication logic provides data interfaces for the flow management module to interact with a physical medium.

17. The device of claim 12, wherein the security bootstrap communication logic includes at least one of a near-field communication and a physically protected communication channel, the physically protected communication channel having a physical wire.

18. The device of claim 12, wherein the security bootstrap communication logic interacts with at least one of internet protocol (IP), Ethernet, Wireless Local Area Network (LAN), Foundation Fieldbus, and Modbus.

19. The device of claim 12, wherein the confidentiality module performs a block cipher which includes at least one of Advanced Encryption Standard (AES), Triple Data Encryption Algorithm applying the Data Encryption Standard, Data Encryption Standard and Blowfish.

20. The device of claim 12, wherein the integrity module implements a hash function including at least one of MD5, SHA1 and SHA2, and a message authentication code of at least one of Keyed-Hash Message Authentication Code (HMAC or NMAC), Cipher-based Message Authentication Code (CMAC), Universal Hashing based Message Authentication Code (UMAC), and Cipher Block Chaining Message Authentication Code (CBC-MAC).

21. The device of claim 12, wherein the integrity and confidentiality modules are implemented using authenticated encryption including at least one of Galois/Counter Mode (GCM), a nonce-based Authenticated Encryption with Associated Data (EAX) mode, an offset codebook mode (OCB) mode, and a Counter with Cipher Block chaining Message Authentication Code (CCM) mode.

22. The device of claim 12, wherein the processor is configured to operate in two phases, which include:
   a. broadcast secret key establishment wherein:
      i. a session key server including the session key-server module sends and receives messages related to identification of one of plural servers as the master key server;
      ii. the master key server generates and establishes a session key among plural security plugs;
      iii. a broadcast key establishment module uses the confidentiality and integrity modules to send key establishment messages to the plural security plugs, where the key management module loads long term keys for the integrity and confidentiality modules to the broadcast key establishment module such that the confidentiality and the integrity modules communicate with a flow management module via the broadcast key establishment module;
      iv. the key management module is updated with master keys and initialization vectors;

v. each session key is loaded on to the integrity and confidentiality modules by the broadcast key establishment module;

vi. the security plugs receive messages from the master key server and apply cryptographic processing identical to that of the master key server and verify security of the sender;

vii. upon receiving an activation signal from the master key server, session keys are loaded on the confidentiality and the integrity modules, and updated in the key management module; and b. secure communication wherein messages received from a controller are processed by the confidentiality and integrity modules directly.

23. The device of claim 12, wherein the security logic modules support secure communication using at least one of unicast, multicast and broadcast communication.

24. The device of claim 12, in combination with an automation network having plural automation components, each automation component comprising at least one of:

a connectivity server, an operator workstation, and an engineering station, wherein at least one of the connectivity server, the operator workstation, and the engineering station are connected by a control network for interacting with plural controllers, field devices and intelligent electronic devices.

25. The device of claim 12, wherein the Ethernet communication logic selects at least one automation component from the group of automation components to generate, initialize, and manage sessions keys across the group of automation components.

26. A method for real-time, secure communication in an automation network including at least one field network and having plural automation components including at least one field device integrally coupled with (a) at least one security plug and (b) at least one session key server, the method comprising:

bootstrapping the at least one security plug, wherein the bootstrapping includes:

i. secret key establishment for dynamic formation of a group of automation components to communicate on the automation network by sending and receiving messages at a session key server module related to selection of a first security plug present in the automation network as a master server, and designating remaining security plugs as slaves for receiving messages from the master server wherein if the at least one security plug includes a plurality of security plugs, the first security plug is selected from the plurality of security plugs by executing a protocol among the plurality of security plugs for selecting the first security plug as the master key server by the plurality of security plugs, upon network boot-up; and ii. secure communication between the automation components wherein messages received from a controller are directly processed by confidentiality and integrity modules of the at least one security plug.

27. The method of claim 26, wherein the bootstrapping is configured to select between:

i. a mode of bootstrap, wherein at least one of (a) a separate communication channel and (b) an integrated communication channel is used to bootstrap devices of the automation network; and ii. a time of bootstrap, wherein master keys are configured during at least one of (a) a manufacture, and (b) installation or commissioning of the at least one security plug and the at least one session key server.

28. The method of claim 26, wherein the secret key establishment comprises:

i. sending and receiving messages at the session key server module related to election of a first session key server of the at least one session key server present in the automation network as a master server;

ii. generating and establishing a session key among all security plugs;

iii. sending key establishment messages to all security plugs in the automation network, where a key management module loads long term keys associated with integrity and confidentiality modules on to a broadcast key establishment module such that the confidentiality and the integrity modules communicate with a flow management module via the broadcast key establishment module;

iv. updating the key management module with master keys and initialization vectors;

v. loading the session key to the integrity and confidentiality modules by the broadcast key establishment module;

vi. designating remaining security plugs as slaves for receiving messages from the master server, and for applying cryptographic processing of the master server, and for verifying security of a sender; and vii. upon receiving an activation signal from the master server, loading session keys on the confidentiality and the integrity modules, and updating the session keys in the key management module.

29. The method of claim 26, comprising: performing secure communication using at least one of unicast, multicast and broadcast communication.

30. The method of claim 26, wherein the at least one security plug is configured to generate, initialize, and manage session keys for other security plugs in the automation network.

* * * * *